United States Patent [19]
Blanco et al.

[11] 3,860,471
[45] Jan. 14, 1975

[54] CERAMIC DECALCOMANIA

[75] Inventors: Louis A. Blanco, Tuckahoe; Hazel W. Meade, Pleasantville, N.Y.

[73] Assignee: Commercial Decal, Inc., Mt. Vernon, N.Y.

[22] Filed: Apr. 9, 1973

[21] Appl. No.: 348,880

Related U.S. Application Data

[60] Division of Ser. No. 110,261, Jan. 27, 1971, Pat. No. 3,772,049, which is a continuation-in-part of Ser. No. 727,649, May 8, 1968, abandoned.

[52] U.S. Cl. .................. 156/89, 106/189, 117/3.5, 117/3.6, 156/236, 161/138, 161/413, 117/125
[51] Int. Cl. ................... C04b 41/06, C04b 33/34
[58] Field of Search .................. 117/3.5, 3.6, 125; 161/146; 156/236, 89

[56] References Cited
UNITED STATES PATENTS

| | | | |
|---|---|---|---|
| 1,924,961 | 8/1933 | Reese | 117/3.5 |
| 2,142,667 | 1/1939 | Bucy | 106/2 |
| 2,143,868 | 1/1939 | Dexheimer | 117/3.5 |
| 2,271,491 | 1/1942 | Rathke | 106/311 |
| 2,351,301 | 6/1944 | Sonnichsen | 260/29.6 BE |
| 2,700,619 | 1/1955 | Sullivan | 117/3.6 |
| 3,007,829 | 11/1961 | Akkeron | 156/89 |

*Primary Examiner*—Theodore Morris
*Attorney, Agent, or Firm*—Lerner, David, Littenburg & Samuel

[57] ABSTRACT

A bonding agent for a ceramic decalcomania comprises a balanced combination of a fast acting solvent and a moderating agent. A thickening agent may also be present. The decalcomania may be applied to the article either before or after a glaze is applied. The use of such a bonding agent for adhering a decalcomania to ceramic ware permits glaze firing without the necessity of first removing the organic material in the decalcomania and fusing the pigment to the ceramic article by prior heat treatment.

14 Claims, No Drawings

CERAMIC DECALCOMANIA

This is a division of application Ser. No. 110,261, filed Jan. 27, 1971, now U.S. Pat. No. 3,772,049 which is a continuation-in-part of U.S. Ser. No. 727,649, filed May 8, 1968, now abandoned, for the same inventor.

BACKGROUND OF THE INVENTION

In applying a decoration, a pattern, or an insignia to ware, it is customary to use a decalcomania comprising a number of layers. There is generally a paper backing, a layer containing the pigment in the form of the decoration and an organic layer, generally of laquer. In applying the decalcomania to the ware, the decalcomania is first removed from the paper backing. This may be done by moistening the decalcomania and sliding the decorated portion off the paper backing. If the decalcomania is moistened with water, it is called a water mount or slide-off decalcomania. In other applications, decalcomania is moistened with solvent (in which case the decalcomania is called a solvent mount). When the paper backing is removed the organic layer maintains the design or insignia intact while transferring the decalcomania to the ware itself. In addition, the organic layer performs the additional function of protecting the design layer during transport and storage of the decalcomania and prevents deterioration or damage of the design or insignia. The organic layer is usually formed from esters or ethers of cellulose, but may be formed of other natural or synethetic film forming materials, e.g., drying oils, acrylic resins, etc.

The ceramic ware is covered with a glaze either before or after the application of the decalcomania thereto. The glaze consists of a vitreous coating which is formed directly from raw materials by firing. Where a transparent glaze is employed, an underglazed decalcomania is provided in which the glaze is applied after the decalcomani is placed on the ware. This method is widely used because the glaze thereafter acts as a protective coating over the decalcomania adding to its longevity and preventing deterioration thereof.

Failure to remove the organic layer before firing, however, coupled with improper adhesion results in imperfections in the final glazed surface. The formation of vapors and the boiling action of the organic layer tended to lift the design layer away from the article surface. Accordingly, the practice of the art has been to adhere the slide-off, water mount decalcomania to the ware by a first firing at a temperature sufficiently high to volatilize and drive off the organic coating and fuse the pigment to the ware for proper adhesion before glazing. Such a procedure called "hardening-on," is time consuming, involves additional labor and handling, and thus reduces the rate of production.

OBJECTS OF THE INVENTION

Accordingly, it is an object of the present invention to provide an improved method for adhering a decalcomania to ceramic ware. Another object is to provide a more rapid method for decorating and glazing ceramic ware. A further object is to provide a process wherein the necessity for removing the organic layer and fusing the pigment to the ware before applying a glaze is eliminated. These and other objects of the present invention will be apparent from the following description.

SUMMARY OF THE INVENTION

It has now been found that the necessity of removing the organic layer from the decalcomania and fusing the pigment to the ware before final glaze firing the ware may be eliminated by applying the decalcomania over a bonding agent, and then glazing and firing the ware. The bonding agent comprises a balanced combination of a fast acting solvent and a moderating agent. The fast acting solvent is selected to act on the organic material in the decalcomania. The moderating agent is selected to regulate the degree of solvency of the fast acting solvent on the organic material in the decalcomania. A thickening agent may also be present when the decalcomania is to be applied to porous ceramic ware.

The present invention is directed to a bonding agent for a ceramic decalcomania, the decalcomania containing a pigment and organic material, the bonding agent comprising a combination of a fast acting solvent and a moderating agent, the fast acting solvent being selected to act on the organic material in the decalcomania, the moderating agent being selected to regulate the degree of solvency of the fast acting solvent on the organic material in the decalcomania.

The present invention is also directed to a method for bonding a decalcomania to ceramic ware by interposing between the ware and the decalcomania a liquid bonding agent according to the present invention. It is also directed to a method wherein the ware may be heat treated at an elevated temperature without a preliminary heat treatment to remove organic material in the decalcomania. It is also directed to a method wherein a glaze composition is applied over the decalcomania and fused without hardening-on the decalcomania in accordance with prior art techniques.

DETAILED DESCRIPTION OF THE INVENTION

An agent for bonding a decalcomania to ceramic ware must satisfy a relatively large number of criteria.

1. It must have sufficient body to stay in place on the ware, particularly when applied to curved or irregular shaped surfaces. When applied to porous ware it must have sufficient body to avoid penetrating the ware.
2. It should flow smoothly when applied to the ware, e.g., when brushed on the ware.
3. It should have good covering properties, and leave no uncovered areas.
4. It must soften the organic material in the decalcomania without disfiguring or destroying the design.
5. It should not bond so quickly that the position of the decalcomania cannot be adjusted on the ware.
6. It must have sufficient solvent action to bond the decalcomania to irregular or curved surfaces.
7. It must insure adhesion of the decalcomania during glazing and firing.
8. It is preferably water soluble or water miscible so as to permit the presence of water dispersible thickening agents, and to permit cleaning of work areas without the use of organic solvents.

The nature of the solvents will depend upon the nature of the organic material in the decalcomania, the size of the decalcomania and the configuration of the ware to which the decalcomania is applied. The combination of the fast acting solvent and a moderating agent is selected to achieve proper handling and bonding properties. The fast acting solvent quickly attacks the organic material, softening it, and bringing it into close contact with the surface of the ware. By itself the fast acting solvent would attack the organic material so fast as to cause the pigment to bleed. At best this results in imperfections and disfigurations in the design, and at worst in total destruction of the design. By itself the fast acting solvent bonds the decalcomania to the ware too quickly. The bonding is so fast that adjustments in the position of the decalcomania cannot be made, and the decalcomania tends to tear when it is rubbed to remove wrinkles and bubbles. The moderating agent controls or regulates the fast acting solvent by preventing it from bonding the decalcomania to the ware too rapidly, and prevents the fast acting solvent from causing the colors in the design to run. The moderating agent enables the position of the decalcomania on the ware to be adjusted and enables it to be rubbed to remove wrinkles and bubbles without tearing.

The fast acting solvent may be a lower alcohol, an ether alcohol, a ketone, an ester, a terpene solvent, an aliphatic hydrocarbon, an aromatic hydrocarbon, a nitrogen-containing heterocyclic compound or mixtures thereof. The lower alcohol may contain up to about 6 carbon atoms and may be aliphatic, cycloaliphatic, or heterocyclic. Some specific examples of suitable alcohols are menthanol, ethanol, propanol, isopropanol, butanol, isobutanol, t-butanol, amyl alcohol, cyclohexanol, and tetrahydrofurfuryl alcohol. The ether alcohols are lower alkyl monoethers of glycols having from 2 to 8 carbon atoms. The lower alkyl substituent may have up to 6 carbon atoms. Some specific examples of suitable ether alcohols are Cellosolve (2 ethoxy ethanol-1), Methyl Cellosolve (2-methoxy ethanol-1), 2-propoxy ethanol-1, Butyl Cellosolve (2-butoxy ethanol-1), hydroxy propyl Cellosolve, 2-hexoxy ethanol-1, N-butexy prepanol, 3-methoxy propanol-1, 3-ethoxy propanol-1, 3-propoxy propanol-1, 3-butoxy propanol-1, 2-methoxy propanol-1, 2-ethoxy propanol-1, 2-propoxy propanol-1, and 2-butoxy propanol-1, Carbitol (diethylene glycol monobutyl ether). The ketones may be aliphatic or cycloaliphatic. Some specific examples are diacetone alcohol, acetone, methyl ethyl ketone and cyclohexanone. Some specific examples of esters are ethylacetate, n-butyl acetate, ethyl lactate, butyl lactate, sec-butyl acetate and sec-amyl acetate. Some specific examples of terpene solvents are alpha and beta penene, dipentene, p-cymene, p-menthane, alphaterpineol, and terpinolene. Examples of aliphatic hydrocarbons are Solvesso 100 and Solvesso 150. Examples of aromatic hydrocarbons are benzene, toluene and xylene. N-methyl-2-pyrrolidone is a suitable nitrogen containing heterocyclic compound.

The moderating agent comprises a polyhydroxy compound, a secondary or tertiary terpene alcohol, for example, of the above mentioned terpene compounds, water solubilized oils, or water. Some examples of polyhydroxy compounds are compounds containing from 2 to 12 carbon atoms, such as ethylene glycol, glycerine, prophylene glycol, butylene glycol, pentylene glycol, mentsoxythritol, trimethylol-propane, hexylene glycol, octylene decylene glycol and dodecylene glycol. The water soluble oils are polyether derivatives of modified drying oils combined with volatile coupling agents, for example, Linaqua, a water soluble linseed oil. Examples of suitable thickening agents include carboxy methyl cellulose, sodium carboxymethyl cellulose, hydroxyethyl cellulose, hydroxy propyl cellulose, polyvinyl alcohol, carboxy venyl polymers, casein, acrylic resins, dextrines, alginates, gums, e.g., gum tragacanth, and gum arabic.

As was pointed out above, the bonding agent of the invention may be formulated in accordance with the nature of the organic material from which the decalcomania is constructed, the size thereof, and the nature and configuration of the ware to which it is being applied. If the thickening agent is desired it may be added in an amount varying between about 0.2 to about 10.0 percent, preferably from about 0.3 to about 6.0 percent. The fast acting solvent may be varied from about 3.0 to about 75 percent with from about 20 to about 70 percent being preferred. The moderating agent may be present in an amount varying from about 30 to about 70 percent being preferred. Percentages given above are by weight, based on the weight of the total composition. In tabular form, the operable and preferred ranges are given below.

RANGES

|  | Operable | Preferred |
| --- | --- | --- |
| Fast acting solvent | 3.0% to 75.0% | 20.0% to 70.0% |
| Moderating agent | 25.0% to 95.0% | 30.0% to 70.0% |
| Thickening agent | 0.02% to 10.0% | 0.3% to 6.0% |

The bonding agent of the present invention is applied as a liquid to the ceramic article before the decalcomania is affixed thereto. The manner of applying the bonding adhesive is not critical. It may be applied in any convenient manner. Surface coating methods of applying the bonding agent, for example, brushing, dipping, spraying, wiping, etc., are suitable. The bonding adhesive should be applied in the form of a substantially continuous layer. Once the bonding agent has been applied to the ware, the decalcomania without its paper backing is transferred onto the wet bonding agent. The solvents then attack the organic material and bond the decalcomania to the ware as it is brought in firm contact with the ware. At this point, in conventional practice, the laquer layer would be removed and the pigment bonded to the ware, or hardened on the ware, for example, by firing the ware at low temperatures for an extended period of time. In accordance with the present invention, however, such a step is unecessary and the bonding agent with the decalcomania applied thereon is ready to be glazed.

The bonding agent of the present invention may be applied directly to the ware in liquid form before positioning the decalcomania on the ware, or it may be applied to the ware along with the decalcomania, for example, by adding the bonding agent to the liquid used to moisten the decalcomania to remove the backing, or by dipping the decalcomania in the bonding agent after removing the backing.

The bonding agent of the present invention forms an intimate bond between the decalcomania and the ware. It adheres the design as firmly to the ware as if it had been printed directly to the ware instead of from a decalcomania.

The bonding agent of the present invention can also be used to adhere decalcomanias to green ware, or to the unfired or raw glaze applied to green ware or bisque ware. Green ware is unfired clay. The decalcomania is adhered directly to the green ware by the bonding agent. The ware is then fired, a glaze is then applied to the ware and the glaze fired. In order to eliminate the separate glaze firing step, the green ware may first be glazed and then the decalcomania applied over the glaze or the decalcomania may be applied before the glaze. Then the ware and glaze are fired and the decalcomania fused in one operation. With the bonding agent of the present invention, the decalcomania may similarly be bonded to bisque ware either before or after the glaze is applied.

The process of the present invention by avoiding the necessity of low temperature firing to remove a layer of organic material and bond the pigment to the ware eliminates steps which had heretofore been necessary and greatly reduces the time and labor required for applying the decalcomania and glazing the ceramic article.

The following examples illustrate the present invention without, however, limiting the same therto.

The examples illustrate typical formulations for the bonding adhesive for the present invention. Unless otherwise indicated, all parts are expressed in parts by weight.

| Example Number | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| Fast acting solvents: | | | | | | | | | | | | | | | | | |
| Turpentine | 30.0 | | | | | | | 14.0 | | | | | | | | | |
| Toluene | | 30.0 | | | | | | | | | | | | | | | |
| N-butoxy propanol | | | | 25.0 | | 20.00 | 3.80 | 2.4 | 11.75 | 25.00 | 47.50 | 57.00 | 66.50 | 7.65 | 43.87 | 52.64 | 61.42 |
| Soluesso | | | 30.0 | | | | | | | | | | | | | | |
| Isopropanol | | | | 25.0 | | 20.00 | | | 11.75 | 25.00 | | | | | | | |
| Butyl cellulose | | | | | 20.0 | | | | | | | | | | | | |
| Diacetone alcohol | | | | | 4.0 | | | 5.0 | | | | | | | | | |
| Butyl lactate | | | | | 4.0 | | | | | | | | | | | | |
| Ethanol | | | | | | 0.50 | | 0.8 | 1.31 | | | | | | | | |
| Ethyl lactate | | | | | | | | | | | | | | | 4.38 | 5.26 | 6.13 |
| Amyl alcohol | | | | | | | | | | | | | | | 0.25 | 0.30 | 0.35 |
| Moderating agents: | | | | | | | | | | | | | | | | | |
| Hexylene glycol | 70.0 | 70.0 | 70.0 | 37.5 | 40.0 | 30.00 | 40.0 | 14.0 | 17.65 | 37.50 | | | | 40.35 | | | |
| Water | | | | 12.5 | 32.0 | 29.47 | 50.4 | 60.7 | 57.16 | 12.50 | 50.00 | 40.00 | 30.00 | 50.05 | 50.00 | 40.00 | 30.00 |
| Thickening agents: | | | | | | | | | | | | | | | | | |
| Carboxy methyl cellulose | | | | | | | 1.6 | | | | | | | | | | |
| Hydroxy propyl cellulose | | | | | | | 4.2 | | | | | | | | | | |
| Sodium carboxy methyl cellulose | | | | | | 0.03 | | 2.6 | 0.38 | | 2.50 | 3.00 | 3.50 | 0.40 | 1.50 | 1.80 | 2.10 |
| Total | 100.0 | 100.0 | 100.0 | 100.0 | 100.0 | 100.00 | 100.0 | 100.0 | 100.00 | 100.00 | 100.00 | 100.00 | 100.00 | 100.00 | 100.00 | 100.00 | 100.00 |

The bonding adhesives of the foregoing examples were coated on ceramic plates. After removing the paper backing from the decalcomanias by soaking in water, each consisting of a backing, pigment layer and laquer film, the decalcomanias were placed on the plates over the bonding adhesive. Some of the decalcomanias were applied with the pigment layer next to the adhesive and the laquer film on top, and others were applied with the laquer film next to the adhesive and the pigment layer on top. The plates were then subjected to a glazing operation and fired without any initial firing to volatilize and drive off the organic material, and fuse the pigment to the plate. After the glazing and firing operations were completed, the plates were inspected. No imperfections were found in the design, nor was any separation from the plate detected.

The foregoing process eliminates the necessity of an initial firing process to remove the organic material and to fuse the pigment to the plate, and the handling and labor involved in inserting the ware in and removing it from the initial firing kiln.

It will be understood that the foregoing description with the details of exemplary structure is not to be construed in any way to limit the invention, but that modification may be made thereto without departing from the scope of the invention as set forth in the following claims.

What is claimed is:

1. A method for decorating a ceramic ware, which comprises the steps of bonding a decalcomania to a ceramic ware employing a bonding agent which consists essentially of from about 20 to about 70 percent of a fast-acting solvent, selected to act on the organic material in the decalcomania, which is selected from the group consisting of mono-hydric alcohols containing up to about 6 carbon atoms, lower alkyl monoethers of $C_2$ to $C_8$ glycols wherein the alkyl groups have up to about 6 carbon atoms, aliphatic or cycloaliphatic ketones, $C_2$ to $C_5$ esters of acetic acid and/or lactic acid, terpene solvents, aliphatic hydrocarbons, aromatic hydrocarbons, nitrogen containing heterocyclic compounds and mixtures thereof, and from about 30 to about 70 percent of a moderating agent, selected to moderate the action of the solvent on the organic material, which is selected from the group consisting of the secondary or tertiary terpene alcohols, glycol compounds containing from about 2 to about 12 carbon atoms selected from the group consisting of propylene glycol, butylene glycol, pentylene glycol, hexylene glycol, octylene glycol, decylene glycol, and dodecylene glycol, and mixtures thereof, and mixtures of one or more thereof with water, said ceramic ware including an unfired glaze layer disposed under or over said decalcomania, and firing said ceramic ware including said glaze, bonding agent and said decalcomania to bond said decalcomania to said ware in a single firing operation.

2. The method in accordance with claim 1, wherein said bonding agent includes from about 0.02 to about 10.0 percent of a thickening agent selected from the group consisting of methylcellulose, polyvinyl alcohol, carboxy vinyl polymers, casein, sodium carboxy methylcellulose, hydroxypropyl cellulose, acrylic resins, dextrines, alginates, gums and mixtures thereof.

3. The method in accordance with claim 2 wherein said fast-acting solvent is n-butoxy propanol and said moderating agent is a mixture of hexylene glycol and water.

4. The method in accordance with claim 3 including hydroxypropyl cellulose and sodium carboxy methylcellulose as thickening agents.

5. The method in accordance with claim 1, including the step of applying a glaze over the decalcomania bonded to the ceramic ware.

6. The method in accordance with claim 1, including the step of firing the ceramic ware after bonding the decalcomania thereto.

7. The method in accordance with claim 1, wherein said bonding agent is applied to the ceramic ware before the decalcomania is affixed thereto.

8. A ceramic ware having a decalcomania bonded thereto, comprising a ceramic ware, a glaze layer and a decalcomania containing a pigment and organic material fired on to said ceramic ware in a single firing operation with said glaze layer, said decalcomania being initially bonded to said ware by means of a bonding agent which consists essentially of from about 20 by about 70 percent of a fast-acting solvent, selected to act on the organic material in the decalcomania, which is selected from the group consisting of monohydric alcohols containing up to about 6 carbon atoms, lower alkyl monoethers of $C_2$ to $C_8$ glycols wherein the alkyl groups have up to about 6 carbon atoms, aliphatic or cycloaliphatic ketones, $C_2$ to $C_5$ esters of acetic acid or lactic acid, terpene solvents, aliphatic hydrocarbons, aromatic hydrocarbons, nitrogen containing heterocyclic compounds and mixtures thereof, and from about 30 to about 70 percent of a moderating agent, selected to moderate the action of the solvent on the organic material, which is selected from the group consisting of the secondary or tertiary terpene alcohols, glycol compounds selected from the group consisting of propylene glycol, butylene glycol, pentylene glycol, hexylene glycol, octylene glycol, decylene glycol and dodecylene glycol and mixtures thereof and mixtures of one or more thereof with water.

9. The ceramic ware according to claim 8, wherein said bonding agent includes from about 0.02 to about 10.0 percent of a thickening agent selected from the group consisting of methylcellulose, hydroxypropyl cellulose, acrylic resins, dextrines, alginates, gums, and mixtures thereof.

10. The ceramic ware according to claim 8, wherein said bonding agent comprises n-butoxy propanol as a fast-acting solvent, hexylene glycol and water as a moderating agent and sodium carboxymethyl cellulose and hydroxypropyl cellulose as a thickening agent.

11. The method in accordance with claim 1 wherein said unfired glaze layer is disposed directly on said ceramic ware prior to bonding said decalcomania to said ceramic ware.

12. The method in accordance with claim 1 wherein said unfired glaze layer is disposed over said decalcomania.

13. The ceramic ware in accordance with claim 8 wherein said glaze layer is disposed between said ceramic ware and said decalcomania.

14. The ceramic ware in accordance with claim 8 wherein said glaze layer is disposed over said decalcomania.

* * * * *